(12) United States Patent
Dhanuka et al.

(10) Patent No.: US 12,211,129 B2
(45) Date of Patent: Jan. 28, 2025

(54) LAYOUT-AWARE TEXT RENDERING AND EFFECTS EXECUTION

(71) Applicant: Adobe Inc., San Jose, CA (US)

(72) Inventors: Praveen Kumar Dhanuka, Kolkata (IN); Nirmal Kumawat, Rajasthan (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/744,393

(22) Filed: May 13, 2022

(65) Prior Publication Data
US 2023/0368445 A1  Nov. 16, 2023

(51) Int. Cl.
| | |
|---|---|
| *G06T 11/60* | (2006.01) |
| *G06F 40/106* | (2020.01) |
| *G06F 40/109* | (2020.01) |
| *G06F 40/166* | (2020.01) |
| *G06T 11/20* | (2006.01) |

(52) U.S. Cl.
CPC ............ *G06T 11/60* (2013.01); *G06F 40/106* (2020.01); *G06F 40/109* (2020.01); *G06F 40/166* (2020.01); *G06T 11/203* (2013.01); *G06T 2210/12* (2013.01); *G06T 2210/21* (2013.01)

(58) Field of Classification Search
CPC ... G06T 11/60; G06T 11/203; G06T 2210/12; G06T 2210/21; G06F 40/109; G06F 40/106; G06F 40/166
See application file for complete search history.

(56) References Cited

U.S. PATENT DOCUMENTS

| | | | | |
|---|---|---|---|---|
| 5,803,629 | A  * |  9/1998 | Neville | G06F 40/109 400/9 |
| 8,438,474 | B1 * |  5/2013 | Lloyd | G06F 16/9574 715/241 |
| 9,251,548 | B1 * |  2/2016 | Garrity | G06T 1/00 |
| 10,922,575 | B1 * |  2/2021 | Singh | G06T 11/203 |
| 2008/0069447 | A1 * |  3/2008 | Hotta | G06V 30/155 382/182 |
| 2008/0238927 | A1 * | 10/2008 | Mansfield | G06T 11/60 345/467 |
| 2011/0119573 | A1 * |  5/2011 | Rudolph | G06F 40/106 715/256 |
| 2012/0158768 | A1 * |  6/2012 | Lamanna | G06F 16/9024 707/769 |

(Continued)

OTHER PUBLICATIONS

Asente et al., "Dynamic Planar Map Illustration," ACM Transactions on Graphics (Proc. SIGGRAPH), 26(3), Aug. 2007, pp. 30:1-30: 10.

(Continued)

*Primary Examiner* — Jin Cheng Wang
(74) *Attorney, Agent, or Firm* — Nicholson De Vos Webster & Elliott LLP

(57) ABSTRACT

Embodiments are disclosed for identifying and modifying overlapping glyphs in a text layout. A method of identifying and modifying overlapping glyphs includes detecting a plurality of overlapping glyphs in a text layout, modifying a geometry of one or more of the overlapping glyphs based on an aesthetic score, updating a rendering tree based on the modified geometry of the one or more overlapping glyphs, and rendering the text layout using the rendering tree.

20 Claims, 14 Drawing Sheets

(56) References Cited

U.S. PATENT DOCUMENTS

| | | | | |
|---|---|---|---|---|
| 2013/0159916 | A1* | 6/2013 | Wadayama | G06F 3/0483 |
| | | | | 715/776 |
| 2015/0030244 | A1* | 1/2015 | Robles-Kelly | H04N 1/6086 |
| | | | | 382/165 |
| 2016/0357720 | A1* | 12/2016 | Thimbleby | G06F 3/1423 |
| 2017/0132484 | A1* | 5/2017 | Malon | G06V 30/153 |
| 2018/0053048 | A1* | 2/2018 | Zhou | G06V 30/18086 |
| 2018/0075296 | A1* | 3/2018 | Matsuda | G06F 3/04883 |
| 2020/0372695 | A1* | 11/2020 | Beri | G06T 11/001 |
| 2021/0012547 | A1* | 1/2021 | Kumawat | G06F 40/109 |
| 2021/0019365 | A1* | 1/2021 | Mangla | G06V 30/414 |
| 2021/0042381 | A1* | 2/2021 | Kumawat | G06F 16/9577 |
| 2021/0081493 | A1* | 3/2021 | Arora | G06F 40/106 |
| 2021/0124907 | A1* | 4/2021 | Deng | G06V 10/955 |

OTHER PUBLICATIONS

Gobithaasan et al., "Numerical Aesthetic Measure of Curves," The 12th Int. Conf. On Human & Computers (HC2009), Dec. 2009, 6 pages.

* cited by examiner

Input Text 600

Overlap detection 602

Overlap Removal 604

LAYOUT-AWARE TEXT RENDERING AND EFFECTS EXECUTION

BACKGROUND

Fonts serve as a core design concept in visual projects. As a result, font designers create complex glyph shapes that embody the project's design aesthetics. In addition to the aesthetics, fonts also need to be designed such that they can be accurately rendered. Font design tools assist font designers in creating complex glyph shapes by enabling designers to design each individual glyph shape in a way that meets their aesthetic goals as well as ensuring that the new glyphs can be readily rendered. Once a font has been created with such tools, it can be made available for use in creating projects that utilize text.

SUMMARY

Introduced here are techniques/technologies that relate to removing overlaps between glyphs in a text layout application. To identify overlapping glyphs, embodiments initially identify groups of candidate overlapping glyphs by comparing the bounding box of a glyph with position data of neighboring glyphs. If the position data falls within the bounding box, the associated glyphs are possibly overlapping. For these candidate overlapping glyphs, embodiments then determine any actual intersections, based on the outline definitions of the glyphs. This is performed similarly for overlaps between glyphs on different lines.

Once overlapping glyphs have been identified, in some embodiments they are marked with an identifier. This identifier is used during rendering to merge the overlapping glyphs. Fills are rendered first, followed by strokes. If a pixel associated with the identifier is already marked as fill, then a stroke is not drawn on that pixel. This eliminates overlaps and results in multiple glyphs being merged into a single shape. Alternatively, the geometry of the overlapping glyphs is modified based on an aesthetic score. In such instances, once overlapping glyphs have been identified, each overlapped region is identified. An aesthetic score is calculated for the segments of the overlapped region belonging to each glyph. The glyph with the higher score is retained, while the outline of the lower scoring glyph is modified based on the higher scoring glyph plus an offset value, producing a layered effect.

This allows for overlaps between neighboring glyphs to be automatically identified and corrected without manual intervention by the user. Also, because this is implemented as part of the rendering pipeline, the text itself is preserved, allowing the user to further edit the text as needed.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
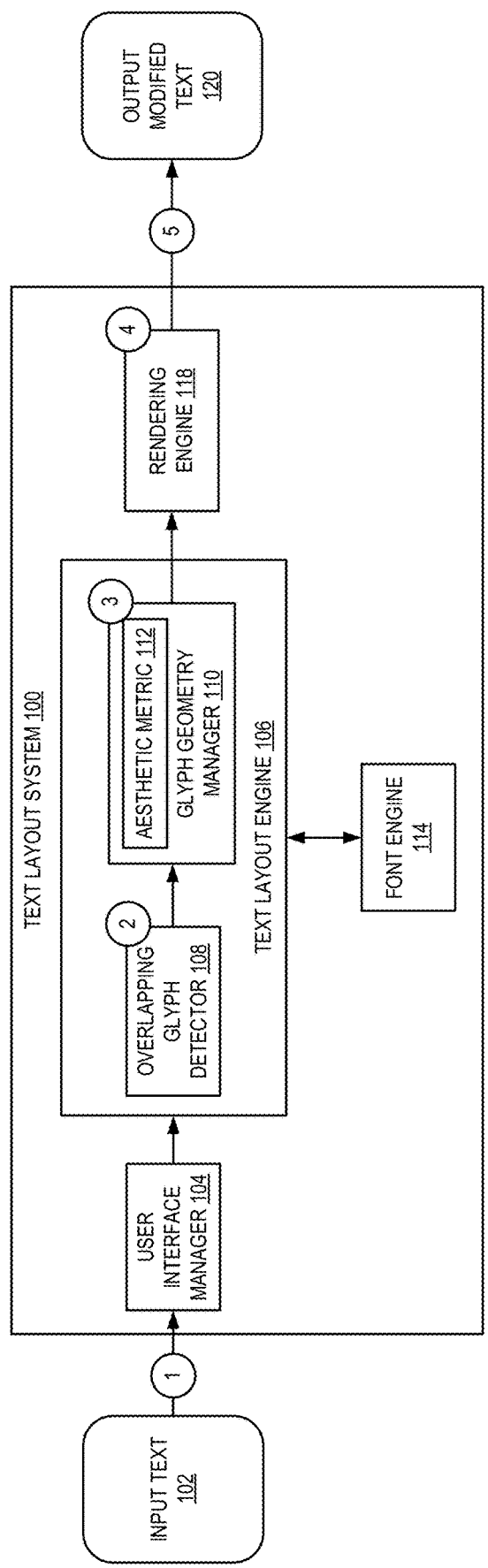
FIG. 1 illustrates a diagram of a process of overlapping glyph modification in live text in accordance with one or more embodiments.

One or more embodiments of the present disclosure provide automatic identification and removal of overlaps between glyphs in live text. Existing font rasterizers and font design tools assist designers in creating individual glyphs. For example, to ensure proper rendering, these tools provide techniques to remove the overlaps within a single glyph shape (e.g., intra-glyph overlaps). However, because these tools are part of font design applications, and not text layout applications, they cannot account for overlaps with neighboring glyphs (e.g., inter-glyph overlaps). As such, any overlaps that exist across glyphs typically require manual effort within a text layout application to remedy. Text layout applications rely on converting text to outlines and then removing the overlaps manually. This is performed manually by the user and is both time consuming and subject to user error. Additionally, once the text has been converted to outlines, it is no longer text and is instead one or more path objects. As such, if there is any change to the underlying text that needs to be made, the project must start over.

Embodiments address these deficiencies in the prior art by identifying and removing inter-glyph overlaps in a text layout application without requiring the text to be converted to outlines or other manual correction by the user. As a user enters text in a text layout application, each glyph is compared to its neighboring glyphs to see if they possibly overlap. For example, a glyph is compared to other glyphs on the same line and/or glyphs on lines above and below the current glyph. This comparison is performed using metadata about the glyphs that are maintained in a font engine, such as glyph bounding box, glyph origin, position information, etc.

Searching each glyph with each adjacent glyph for outline intersections can become computationally costly. Accordingly, embodiments first identify glyphs that may possibly overlap (referred to herein as "candidate overlapping glyphs"). For example, if a glyph's origin, left position, right, position, or other position data falls within another glyph's bounding box, then this pair of glyphs may overlap. The outlines of these candidate overlapping glyphs can then be compared to determine if they intersect. This results in an overlapping glyphs list which indicates those groups (e.g., two or more glyphs) that actually intersect.

Once the overlapping glyphs have been identified, then the overlaps can be removed. Embodiments can perform this removal in multiple ways. In some embodiments, an aesthetic score is calculated for an overlapping region to determine which glyph is to be modified. The outline of the more aesthetically pleasing glyph, along with an offset value, is used to modify the outline of the less aesthetically pleasing glyph. This modified geometry is used during rendering to automatically remove the overlaps between the glyphs and results in a layered appearance. Alternatively, the overlapping glyphs may be merged at rendering time. For example, an identifier is associated with each group of overlapping glyphs. At rendering time, fill pixels are written first, with the identifier and a sentinel value indicating that the fill pixels are associated with an overlapping glyph. When stroke pixels are written, if it is determined that a stroke pixel is to be written where a fill pixel of an overlapping glyph has already been written, then the stroke pixel is ignored. This results in a merged appearance of the glyphs.

In both instances, overlaps are removed automatically, without manual intervention by the user. Additionally, the text remains text, it has not been reduced to outline path objects. Therefore, it can be edited as text and any changes to the text do not require the project to be restarted. Additionally, since overlap removal is implemented as part of the rendering pipeline, there are no editing operations needed to be supported by the application or which the user needs to learn. Further, identifiers are assigned to glyphs that overlap, this keeps added overhead to a minimum by only impacting the overlapping glyphs. Embodiments also improve the effects pipeline. In conventional systems, text effects are also overlapped where the glyphs overlap, which is visually apparent in the effect. Embodiments instead apply the effects using the modified geometry of the overlapping glyphs which eliminates any visual artifacts caused by the overlap.

FIG. 1 illustrates a diagram of a process of overlapping glyph modification in live text in accordance with one or more embodiments. As shown in FIG. 1, a text layout system 100 receives input text 102 from a user at numeral 1. In various embodiments, text layout system 100 is implemented as a desktop publishing application, or other text layout application, executing on a computing device (e.g., desktop computer, laptop computer, tablet, mobile device, etc.). The text layout system 100 includes a user interface manager 104, such as a graphical user interface (GUI), through which the user provides input text 102. The input text is provided using e.g., an input device such as a keyboard, virtual keyboard, a speech-to-text device, etc.

As the user enters text via user interface manager 104, the text is processed by text layout engine 106. The text layout engine 106 includes an overlapping glyph detector 108 and a glyph geometry manager 110. This enables overlaps in live text (e.g., text being actively entered) to be identified and corrected. At numeral 2, the overlapping glyph detector 108 compares the bounding box of a glyph that has been entered to adjacent glyphs. As discussed further below, this may include searching left and right of the current glyph (e.g., on the same line of text) as well as above and below (e.g., on different lines of text). Glyphs whose bounding boxes overlap are added to a candidate overlapping glyphs list. The overlapping glyph detector 108 further processes the candidate glyphs by retrieving the outline data associated with the candidate glyphs. In some embodiments, the outline data is retrieved from font engine 114, which maintains information about the glyphs of each font, including their outlines. Using the outline data, the overlapping glyph detector identifies one or more pairs of glyphs which do overlap. These glyphs are added to an overlapping glyph list which is used by glyph geometry manager 110 to modify the geometry of the overlapping glyphs.

Glyph geometry manager 110 implements one or more techniques for removing overlapping regions from overlapping glyphs, at numeral 3. For example, in some embodiments, the geometry of one or both of the overlapping glyphs is modified by the overlapping glyph manager to account for the overlap region. Using the outlines of each glyph, the overlapping region is identified. The glyph to be modified for a given region is selected using an aesthetic metric 112. This effectively removes the overlapping region, plus an offset, from one glyph while leaving the other glyph unmodified. Where there are multiple overlapping regions between a pair of glyphs, each region is separately evaluated using the aesthetic metric. As a result, for a given pair of overlapping glyphs, both or only one glyph may be modified. The modified glyph geometry is provided by the glyph geometry manager to rendering engine 118.

Alternatively, overlapping glyphs are assigned a unique identifier by glyph geometry manager 110. During rendering, when an identifier associated with overlapping glyphs is identified, rendering of these characters is modified such that any pixels of the overlapping region are only drawn once. For example, in some embodiments, each text object with overlapped glyphs is assigned a unique identifier which may take the form of a bit mask flag (e.g., 0x0001, 0x0002, 0x0004 and so on.). The characters belonging to a text object are also associated with the identifier. While rendering the text object by a processing device (e.g., CPU, GPU, accelerator, etc.), every character will mark a buffer (e.g., a frame buffer equivalent to the size of bounding box of the text object) with its identifier. For example, when the processing device is a GPU, this may be performed by the fragment shader. If the value in the buffer has a bit already corresponding to the identifier of the character to be drawn, then the corresponding pixel will not be marked for drawing. Hence two pixels will never be drawn if they belong to the overlapping glyph of that text object.

Additionally, fill pixels are given priority over stroke pixels, ensuring that any overlapping stroke pixels do not overwrite overlapping fill pixels. In some embodiments, each group of overlapping glyphs (e.g., two or more) is associated with an identifier. During rendering, the identifier and sentinel values are used to ensure that stroke pixels do not overwrite fill pixels. For example, in a first rendering phase, fill pixels associated with the overlapping region are written (e.g., to a frame buffer). Each pixel that is written is associated with the identifier associated with the glyph and a sentinel value indicating it is a fill. In a second rendering phase, stroke pixels associated with the overlapping region are written. However, if a stroke pixel is to be drawn where a fill pixel has already been drawn, then the stroke pixel is skipped. In some embodiments, one or more bits (e.g., the sentinel value) is reserved for fill and stroke. For example, if the identifier of a character is X, then the bit value is set to 0x8000 AND X to mark for fill. As a result, while drawing strokes, if the pixel is already marked for fill (by checking the first bit of the sentinel value at the pixel), then that pixel is not marked with the stroke color. If the pixel is not marked for fill, then it can be marked for stroke as usual. After the text objects have been drawn, the buffer is flushed. This effectively merges the overlapping glyphs by preventing overlapping stroke pixels from overwriting fill pixels.

Rendering engine 118 renders the text, including the overlapping glyphs, at numeral 4. For example, the rendering engine 118 uses a rendering tree, e.g., a text DOM tree, which is a structural hierarchy of the text to be rendered. In some embodiments, each overlapping pair of glyphs is assigned to a node of the rendering tree. The modified geometry determined by the glyph geometry manager 110 is associated with the corresponding node such that at render time, the modified geometry is used to render the glyphs instead of the default glyph geometry maintained by the font engine. Alternatively, the nodes corresponding to overlapping glyphs are associated with their assigned identifiers. This way, during rendering, the glyphs are rendered such that the glyphs are combined at rendering time. The rendering engine renders the output modified text 120 at numeral 5. The output modified text 120 has been modified to address the overlapping glyphs automatically, without reducing the glyphs to their outlines or manual intervention by the user. As a result, the text can be updated or changed as needed.

Figure 2:
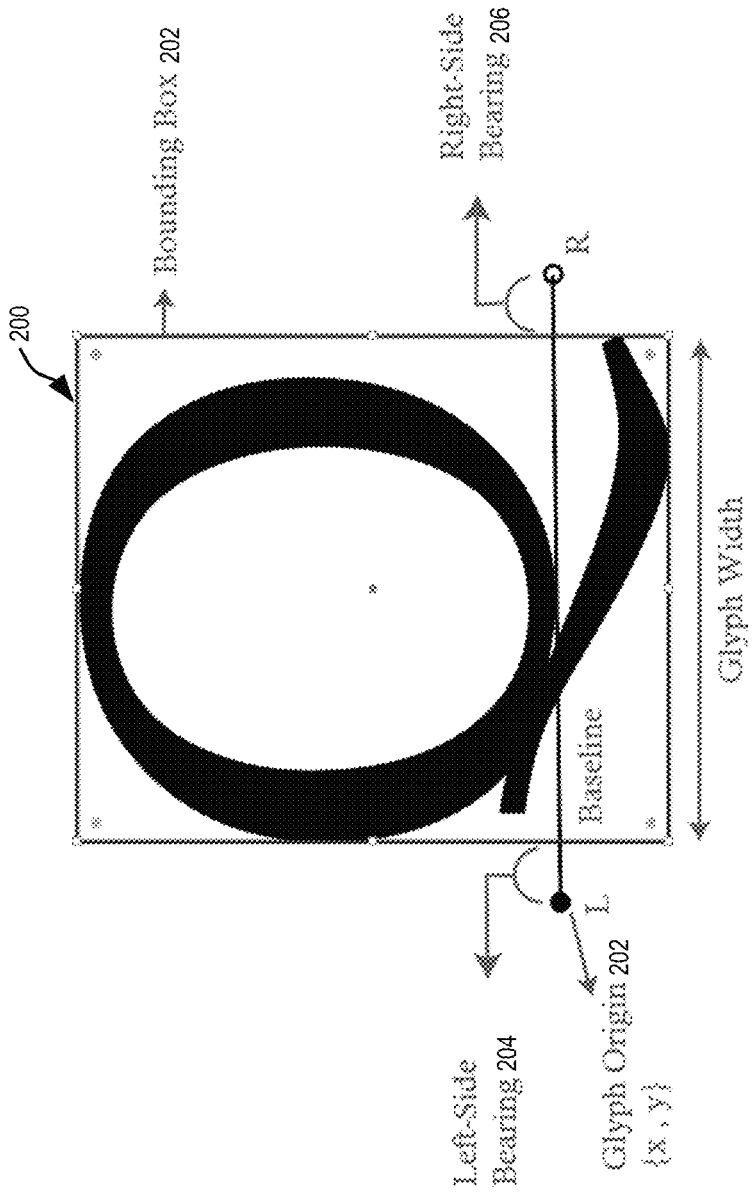
FIG. 2 illustrates a diagram of glyph properties in accordance with one or more embodiments.

FIG. 2 illustrates a diagram of glyph properties in accordance with one or more embodiments. As discussed, a font engine maintains metadata associated with glyphs. For example, as shown in FIG. 2, a glyph 200 has metadata associated with it, such as glyph origin 202, used for glyph positioning. This origin is calculated using a left bearing 204 and/or right bearing 206, relative to a bounding box 208 of the glyph 200. Text composition is governed by rules which maintains its appearance always in a standard ordered fashion e.g., left to right, top to bottom, etc. This ensures that glyph origins of glyphs in the text always appear in an orderly, sorted fashion. This order allows for greedily determining and trimming down the glyph search space for detecting the glyph outline overlaps.

Figure 3:
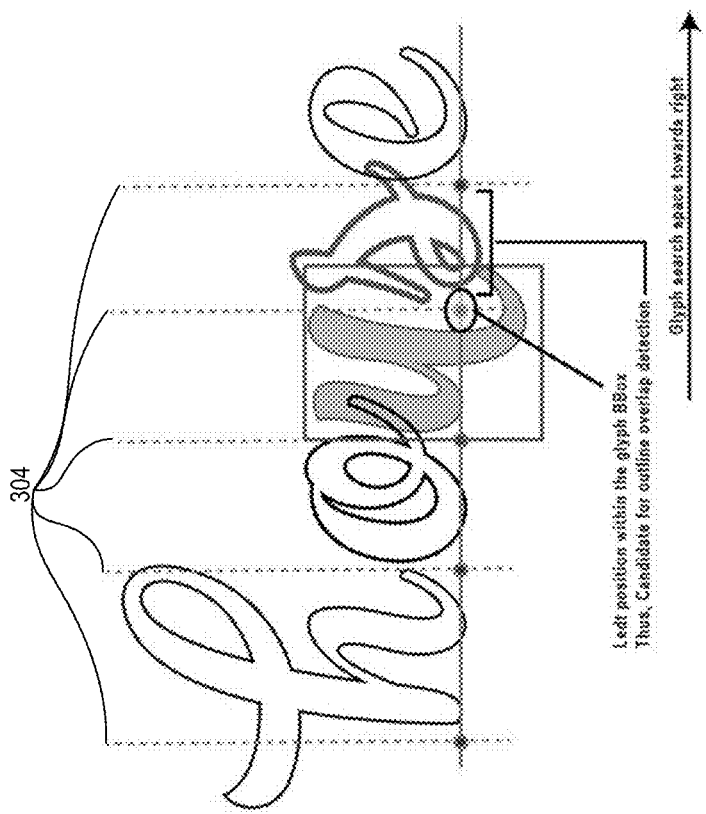
FIG. 3 illustrates a diagram of a process of searching for candidate overlapping glyphs in accordance with one or more embodiments.
Figure 3:
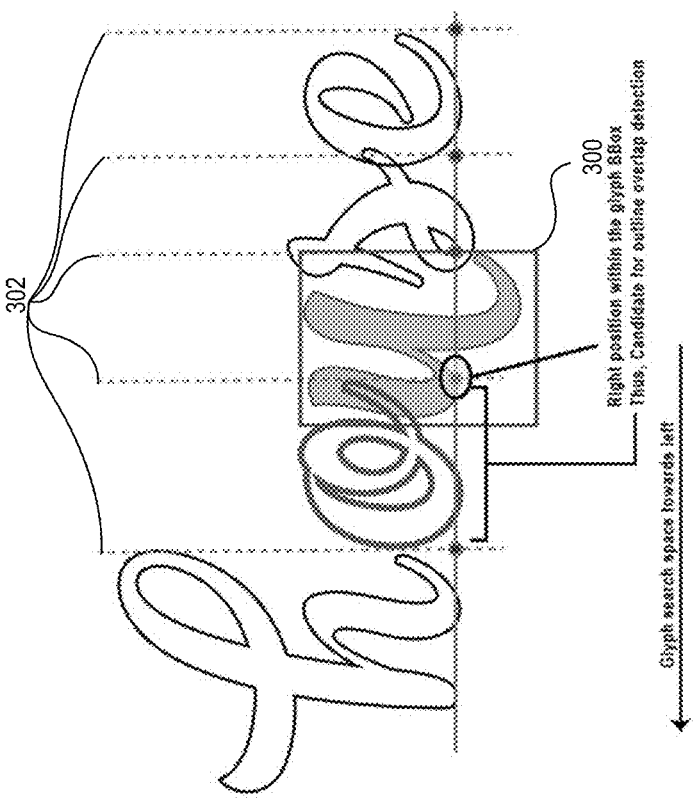

FIG. 3 illustrates a diagram of a process of searching for candidate overlapping glyphs in accordance with one or more embodiments. As shown in FIG. 3, the process of searching for overlapping glyphs includes parsing the text lines individually for glyph overlaps. Starting with the first glyph of each line, adjacent glyphs are identified. For a single line, the search space includes glyphs to the left and to the right of the glyph being searched (e.g., the "current" glyph). In the left direction, adjacent glyphs are identified as those glyphs having their right position within the bounding box of the current glyph. In some embodiments, this is determined via rectangular box intersection. For example, as shown in FIG. 3, the glyph 'u' is the current glyph whose bounding box 300 is compared with the right positions 302 of each adjacent glyph on the line. In this example, the right position of the "o" glyph is within the bounding box 300 and therefore is a candidate for overlapping and is added to a candidate overlapping glyphs list.

Similarly, in the right direction, adjacent glyphs are identified as those glyphs having their left position 304 within the bounding box of the current glyph. This process helps in determining the minimal set of glyphs for detecting the outline overlap. In this example, the left position of the "s" glyph is within the bounding box of the current "u" glyph and is therefore also added to the candidate overlapping glyphs list.

For multi-line overlap detection, the search space is defined based on the sorted order glyph origins. For example, for each overlapping glyph or group of glyphs, its bounding box intersection with the glyph origins of lines above and below is determined. In some embodiments, this is performed by, for each glyph group of a line, identify the projection of a glyph's (or group of glyphs') bounding box on the next line. Then the glyph origins of glyphs on that line are compared to the bounding box projection. Any glyphs or groups of glyphs whose origins overlap with the bounding box projection are added to the candidate glyph list. The outlines of the candidate glyphs are then used to identify actual overlapping glyphs.

Figure 4:
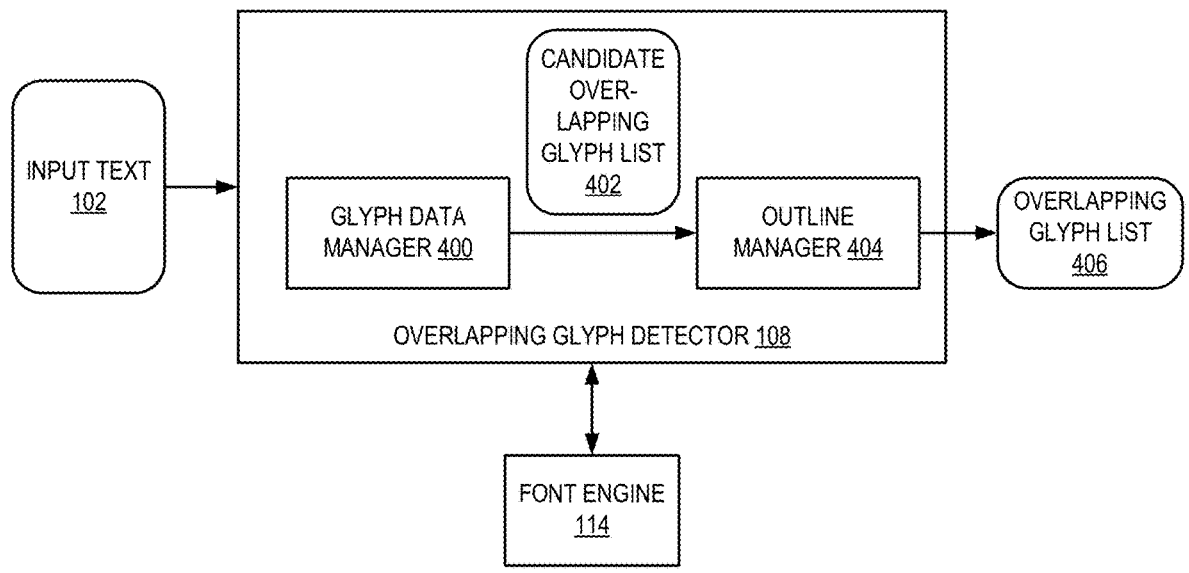
FIG. 4 illustrates a diagram of a process of identifying overlapping glyphs in accordance with one or more embodiments.

FIG. 4 illustrates a diagram of a process of identifying overlapping glyphs in accordance with one or more embodiments. In FIG. 4, overlapping glyph detector 108 includes glyph data manager 400 and outline manager 404. Glyph data manager 400 is responsible for retrieving the glyph metadata from font engine 114 and comparing the relevant position(s) of adjacent glyphs to the current glyph bounding box, as discussed above. The glyph data manager 400 generates the candidate overlapping glyph list 402.

Based on the candidate overlapping glyph list 402, outline manager 404 determines outline intersections, if any, between the candidate overlapping glyphs. For example, in some embodiments, the outline manager 404 retrieves outline data from font engine 114 and identifies intersections between the overlapping glyphs or determines that no intersections exist between the glyphs. Any candidate overlapping glyphs that are determined not to overlap based on their outlines can be removed from the candidate overlapping glyphs list to generate overlapping glyphs list 406. As discussed, the overlapping glyph list is used by the glyph geometry manager to merge or modify the geometry of the glyphs in the overlapping regions.

Figure 5:
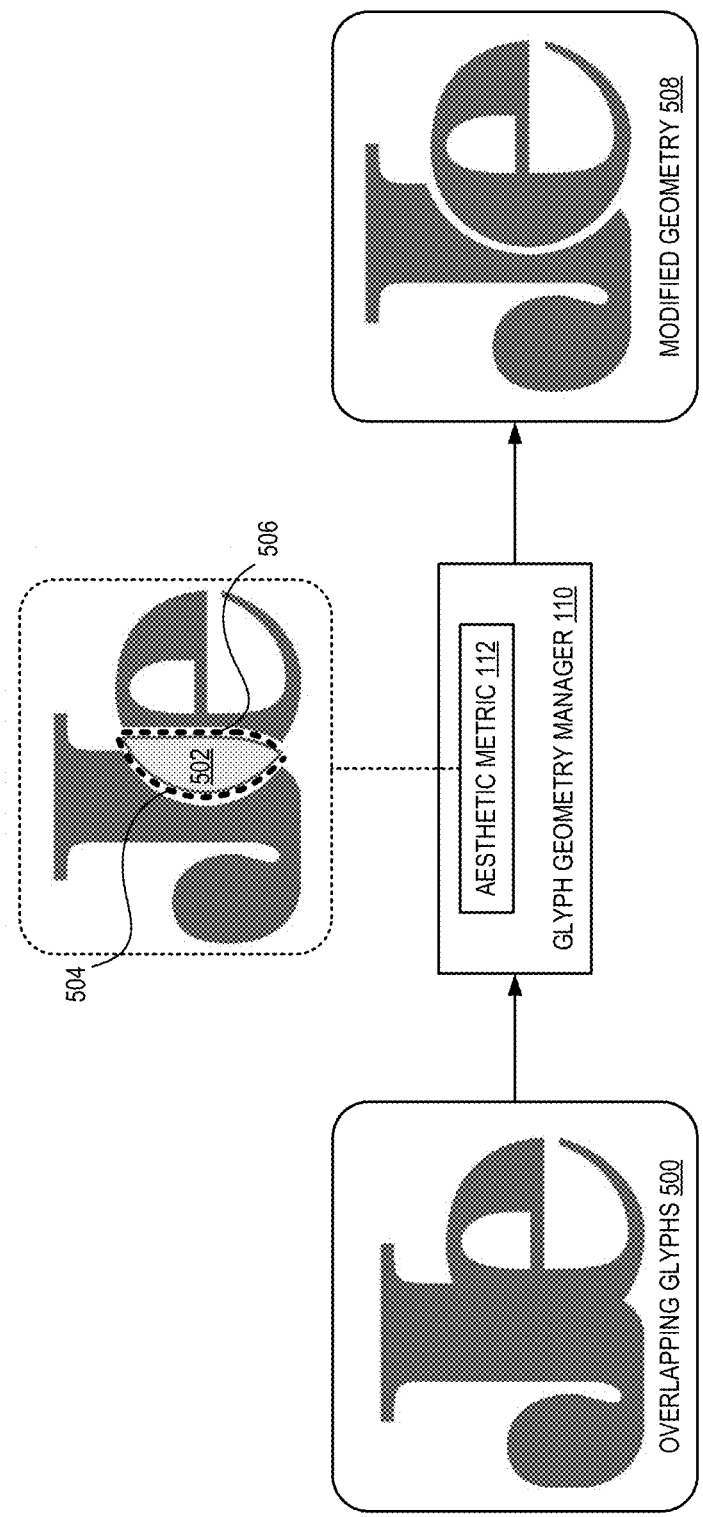
FIG. 5 illustrates a diagram of a process of modifying the geometry of overlapping glyphs in accordance with one or more embodiments.

FIG. 5 illustrates a diagram of a process of modifying the geometry of overlapping glyphs in accordance with one or more embodiments. As shown in FIG. 5, the glyph geometry manager 110 receives a list of overlapping glyphs. For a given pair of overlapping glyphs 500, the glyph geometry manager 110 can determine how to modify the geometry of one or more of the glyphs to yield an aesthetically pleasing result. For example, glyph geometry manager 110 can identify an overlapping region 502 which includes the portion of the two glyphs that overlap. In some embodiments, the overlapping region 502 is identified using a planar map. This region is bounded by a segment 504 associated with one glyph (e.g., the 'e' glyph) and a segment 506 associated with the other glyph (e.g., the 'j' glyph). The example of FIG. 5 shows a simple overlap region formed by two segments, however overlapping regions formed by other glyphs in other fonts may include more complex regions formed by multiple segments of the overlapping glyphs.

The glyph geometry manager 110 uses an aesthetic metric 112 to determine how to modify the geometry of the glyphs. For example, in some embodiments, the aesthetic metric uses a variation of Birkhoff's formula applied to Bezier segments. This is used to calculate the curvature ($\kappa$) profile and its variation ($\kappa'$) for each segment. This particular aesthetic score prefers monotone curvature over oscillations, for example segments having multiple inflection points, curvature extrema, cusps, etc. will have a lower aesthetic score than segments without those features. One example of a modified Birkhoff's formula that can be used in some embodiments is expressed as:

$$M = \frac{O_\kappa + O_\lambda}{C_{IP} + C_{CE} + C_C + C_L + 1}$$

where:

$$O_\kappa = \begin{cases} 3, & \text{if } \kappa(t) = \text{constant or } \kappa(t) = 0 \\ 2, & \text{if } \kappa(t) \text{ is representable as } LINCE \\ 1, & \text{if } \kappa(t) \text{ is representable as } BLINCE \\ 0, & \text{otherwise} \end{cases}$$

$$O_\lambda = \begin{cases} 3, & \text{if } \lambda(t) = \text{constant} \\ 2, & \text{if } \lambda(t) = mt + c \\ 1, & \text{otherwise} \end{cases}$$

$C_{IP}$ = number of inflection points $C_{CE}$ = number of curvature extrema $$C_C = \begin{cases} 2, & \text{if cusp exisits} \\ 0, & \text{otherwise} \end{cases}$$

$$C_L = \begin{cases} 2, & \text{if loop exisits} \\ 0, & \text{otherwise} \end{cases}$$

As noted, the above expression is one example of a modified Birkhoff's formula that can be used. Depending on implementation, more or fewer terms may be incorporated into such a formula that represent additional or different characteristics of the curve(s) being evaluated.

In some embodiments, the aesthetic metric is calculated at the segment level for the overlapping region. Where the overlapping region includes multiple segments, the scores may be normalized based on the number of segments associated with the same glyph. The glyph associated with the segment with the lower (e.g., less aesthetically pleasing) score is the glyph that is selected by the glyph geometry manager 110 to be modified. In some embodiments, the glyph selected to be modified is modified based on the dimensions of the overlapping region and an offset value. For example, the outlines of each glyph are retrieved from font engine 114. The outline of the unmodified glyph is expanded by an offset value. The new outline of the modified glyph is then determined by subtracting the outline of the glyph to be modified from the expanded outline of the other glyph.

For example, if glyphs $g_a$ and $g_b$ are determined to overlap, then their corresponding outlines ca and $c_b$ are retrieved. The glyph to be modified is determined based on the aesthetic scores associated with the segments of the overlapping region. If it is assumed that glyph $g_a$ is to be modified, then the outline of $g_b$, $c_b$, is augmented by an offset value to create $c'_b$. The modified geometry of glyph $g_a$ can then be represented as $c'_a = (c_a - c'_b)$. As shown in FIG. 5, the resulting modified geometry 508 retains glyph 'e' while modifying the geometry of glyph 'j' plus an offset.

Figure 6:
FIG. 6 illustrates an example of modifying the geometry of overlapping glyphs in accordance with one or more embodiments.
Figure 6:
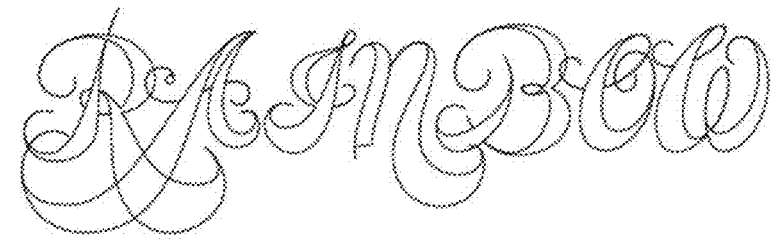
Figure 6:
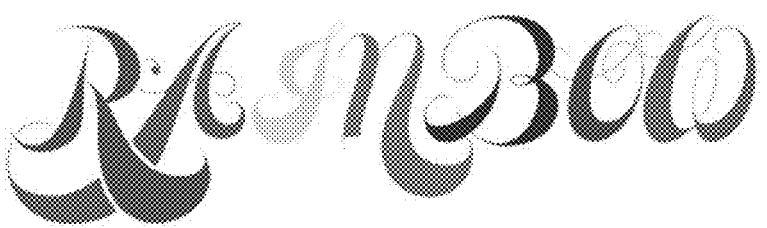
Figure 6:
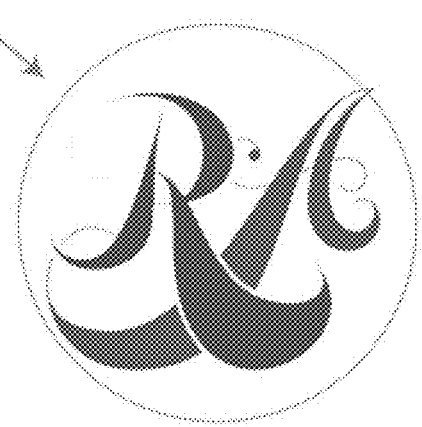

FIG. 6 illustrates an example of modifying the geometry of overlapping glyphs in accordance with one or more embodiments. As shown in FIG. 6, the input text 600 RAINBOW is provided to a text layout system. Using the techniques described above, overlap detection 602 is performed on the text as it is entered. In this example, the outlines of all glyphs are shown, however as described above in various embodiments the outlines are only retrieved for candidate overlapping glyphs which may include fewer glyphs than those entered. Once overlap removal 604 has been performed, the glyph geometry has been modified, as shown at 606. In particular, the 'A' glyph has been modified based on the outline of the 'R' glyph plus an offset. To accurately render the modified geometry, this modified geometry is provided to the rendering engine.

Figure 7:
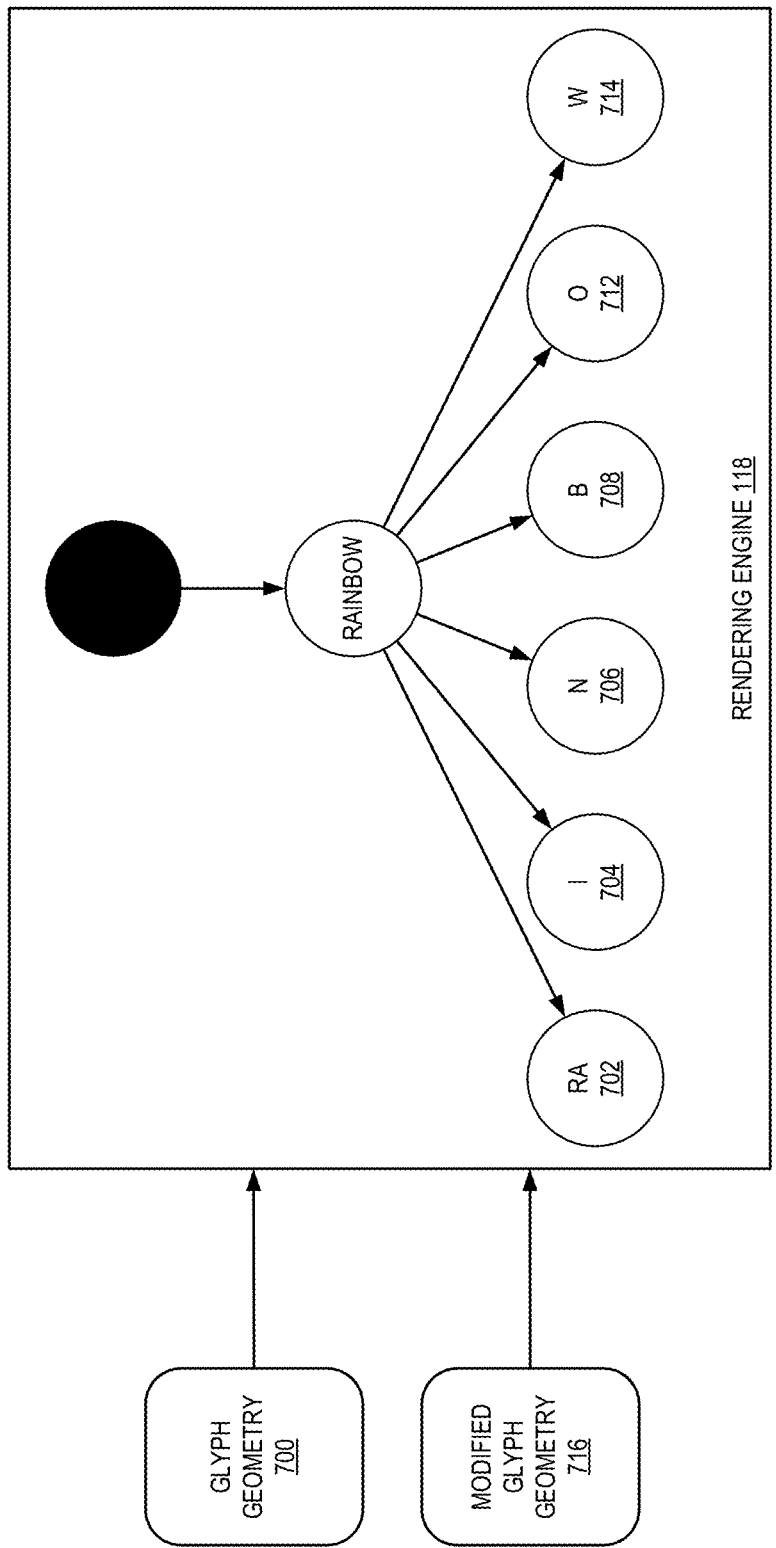
FIG. 7 illustrates an example of updating a rendering tree with modified geometry in accordance with one or more embodiments.

FIG. 7 illustrates an example of updating a rendering tree with modified geometry in accordance with one or more embodiments. A shown in FIG. 7, the rendering engine 118 uses a rendering tree to render the text. The rendering tree may be created from a text DOM tree which may include additional levels. For example, the first level may include line strikes, where text on different lines is organized into nodes, followed by a second level in which the text is broken into glyph runs with the same features (e.g., segment strikes). This may then be followed by a third level in which each segment node is broken down into individual glyphs, known as the glyph strike. These glyph nodes may include the bound information of its glyphs and glyph origins for glyph positioning. This level includes information related to the glyph including its outline path information and positioning extracted from the font engine.

In some embodiments, the rendering tree is a DOM tree. In a conventional rendering tree for any text objects, a separate node is created for each character having the same properties. The characters are then drawn sequentially from bottom to top in stack order using the glyph geometry 700 and other glyph metadata obtained from the font engine. However, for overlap removal, the geometry has been modified. Accordingly, the rendering tree needs to be modified to ensure that the correct geometry is used to render the modified glyphs.

As shown in FIG. 7, the overlapped glyphs are extracted as a separate node 702 and all other glyphs as normal nodes 704-714. The overlapped glyph node 702 uses the modified glyph geometry 716 obtained from the glyph geometry manager rather than the standard glyph geometry. In some embodiments, the overlapped glyph node 702 is associated with an identifier that the rendering engine uses to obtain the corresponding modified glyph geometry.

Figure 8:
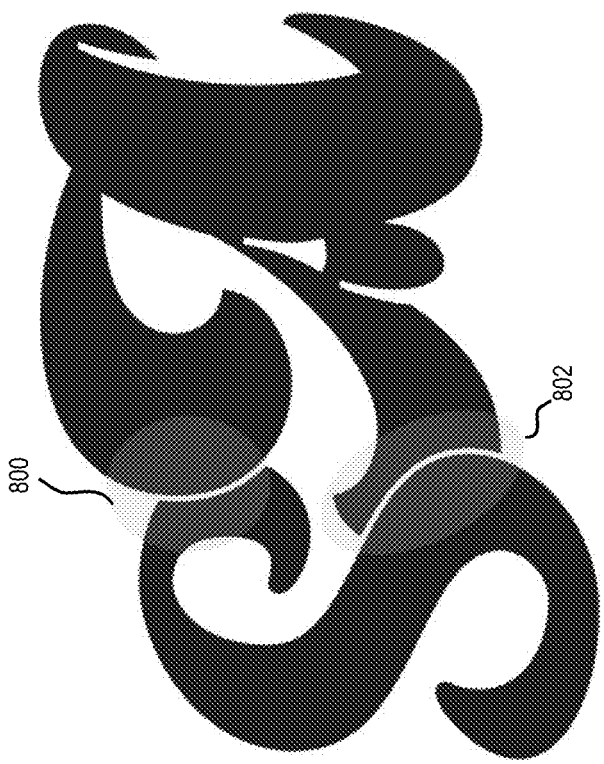
FIG. 8 illustrates an example of modifying the geometry of overlapping glyphs in multiple regions in accordance with one or more embodiments.
Figure 8:

FIG. 8 illustrates an example of modifying the geometry of overlapping glyphs in multiple regions in accordance with one or more embodiments. As shown in FIG. 8, multiple overlapping regions can be present between any given pair of glyphs. In this example, there are two overlapping regions between the 's' glyph and the 'a' glyph. Using the techniques described above, the geometry of the glyphs is modified based on the aesthetic score for the region. Each region can be evaluated independently. Therefore, if one glyph is selected to overlap in one region, the other glyph may be selected to overlap in the other region. As shown in FIG. 8, the 'a' glyph is selected in region 800 and the 's' glyph is selected in region 802.

Figure 9:
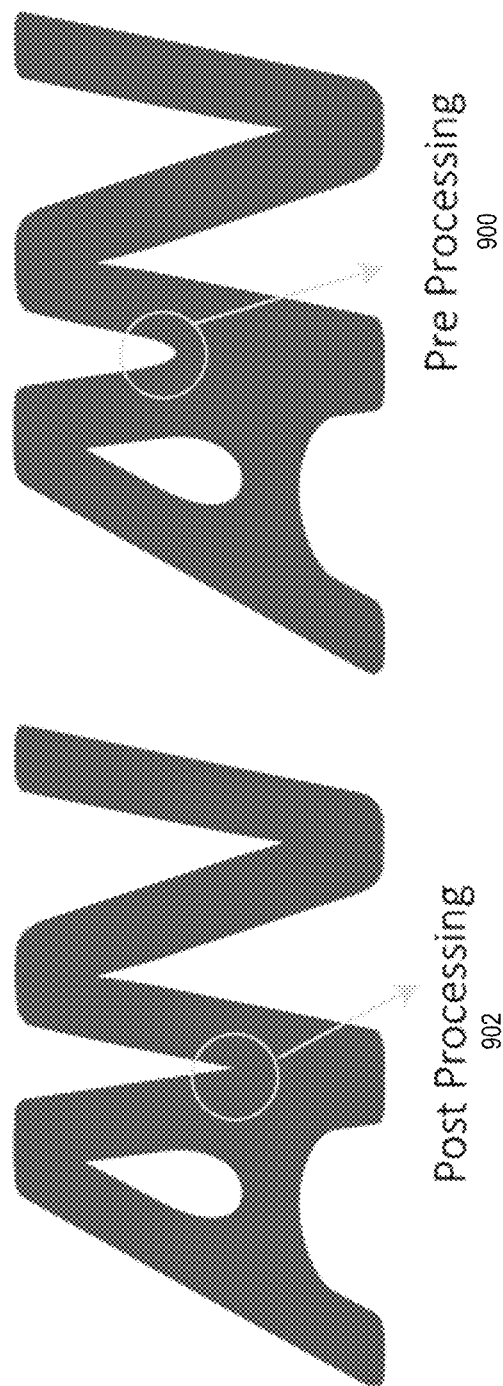
FIG. 9 illustrates an example of effects processing on overlapping glyphs in accordance with one or more embodiments.

FIG. 9 illustrates an example of effects processing on overlapping glyphs in in accordance with one or more embodiments. As discussed, effects pipelines are also affected by overlapping regions of glyphs. For example, if a filter is applied to the glyphs, the overlapping region can have the filter applied twice. This can lead to a visual artifact where the region with twice applied filter appears different from the rest of the glyphs. Since overlapping glyphs are identified, as discussed above, effects can be applied either in post-processing or pre-processing.

In pre-processing, the merge/modification of the overlapping glyphs is applied first, followed by the effects. Accordingly, the merged outline is first identified for the overlapping glyphs. For example, as discussed above, the outline of the merged or modified glyphs (e.g., the "modified geometry") is determined. Once that outline is known, the effects are applied over the modified geometry. In the pre-processing 900 example of FIG. 9, the curved effect is applied on the merged outline, resulting in the rounded corner of the intersection between the 'a' and 'n' glyphs. Alternatively, in post-processing, the effects are applied to the unmodified geometry of the overlapping glyphs and then the techniques described above are applied to the result. As shown in post-processing example 902, the effect is applied separately to the 'a' and 'n' glyphs, and then the glyphs are merged. As a result, the intersection of the 'a' and 'n' glyphs has not been rounded. In various embodiments, effects processing is user-selectable either globally (e.g., all effects are applied in pre-processing or post-processing) or on a case-by-case basis (e.g., some effects may be applied in pre-processing while other effects may be applied in post-processing).

Figure 10:
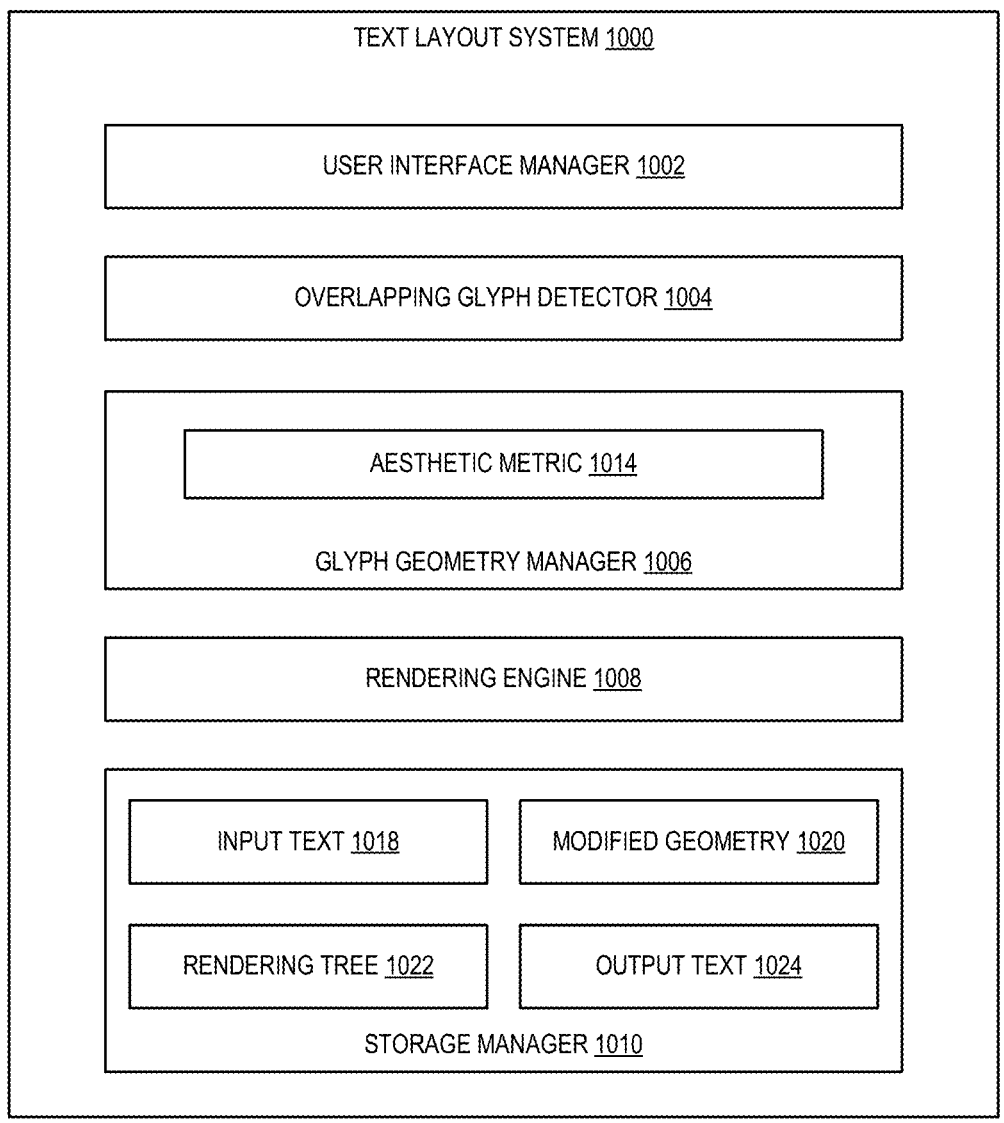
FIG. 10 illustrates a schematic diagram of a text layout system in accordance with one or more embodiments.

FIG. 10 illustrates a schematic diagram of text layout system (e.g., "text layout system" described above) in accordance with one or more embodiments. As shown, the text layout system 1000 may include, but is not limited to, user interface manager 1002, overlapping glyph detector 1004, glyph geometry manager 1006, rendering engine 1008, and storage manager 1010. The glyph geometry manager 1006 includes aesthetic metric 1014. The storage manager 1010 includes input text 1018, modified geometry 1020, rendering tree 1022, and output text 1024.

As illustrated in FIG. 10, the text layout system 1000 includes a user interface manager 1002. For example, the user interface manager 1002 allows users to provide input text 1018 to the text layout system 1000. In some embodiments, the user interface manager 1002 provides a user interface through which the user can enter the input text 1018 which is processed live to remove overlaps, as discussed above. Alternatively, or additionally, the user interface may enable the user to download the input text (e.g., such as an existing text layout project) from a local or remote storage location (e.g., by providing an address (e.g., a URL or other endpoint) associated with an image source). In some embodiments, the user interface can receive the input text using various user input devices, such as a keyboard, virtual keyboard, microphone (e.g., for speech to text), camera (e.g., for optical character recognition), or other hardware or software user input devices.

Additionally, the user interface manager 1002 allows users to specify how overlaps are to be removed. For example, the user can select to have overlapping characters merged or to have one character's geometry modified based on the overlapping character plus an offset, as discussed above. The user interface manager 1002 further enables the user to select how effects are to be processed (e.g., as pre-processing or post-processing).

As illustrated in FIG. 10, the text layout system 1000 also includes overlapping glyph detector 1004. As discussed, the overlapping glyph detector 1004 identifies candidate overlapping glyphs using metadata about the glyphs. For example, for a current glyph, the overlapping glyph detector 1004 defines a search space left and right (e.g., on the same line as the current glyph) and above and below (e.g., on different lines as the current glyph) and identifies candidate glyphs within this search space based on the bounding box of the current glyph and position information (e.g., glyph origin, right- or left-side bearings, bounding box, etc.) of adjacent glyphs. From the resulting list of candidate glyphs, outlines of the candidate glyphs are retrieved (e.g., from a font engine, font dictionary, or other source) and the outlines are compared to identify any intersection points. If there are no intersections, then the candidate overlapping glyphs are ignored. Any candidate glyphs that do overlap are added to an overlapping glyph list and passed to the glyph geometry manager for further processing.

As illustrated in FIG. 10, the text layout system 1000 also includes glyph geometry manager 1006. As discussed, the glyph geometry manager 1006 can modify glyph geometry of the overlapping glyphs. In some embodiments, this includes identifying, for each overlapping region between a pair of glyphs, the more aesthetically pleasing glyph using aesthetic metric 1014. The aesthetic metric 1014 can include any metric that identifies a preferred glyph which will not be modified. One example of an aesthetic metric is Birkhoff's formula. As discussed above, a modified version of Birkhoff's formula may be employed which identifies the more aesthetically pleasing segment(s) of an overlapping region based on the segment's curvature, changes in the curvature, etc. Once the preferred glyph is identified, the other glyph's geometry is modified based on the preferred glyph's geometry plus an offset value. The offset value may be a fixed value, may vary based on a function (e.g., as a function of the segment's curvature or other characteristic), may be user-defined, etc.

Alternatively, as discussed, the glyph geometry manager associates an identifier with each pair of overlapping glyphs. This identifier is used during rendering to limit the number of times an overlapping region is drawn to 1. Additionally, preference is given to fill pixels over stroke pixels. This way, if a pixel has already been marked with a fill value and the identifier associated with the overlapping glyphs, any overlapping stroke pixels associated with the same identifier will not overwrite the fill values. In some embodiments, as shown in FIG. 1, the overlapping glyph detector and glyph geometry manager may be implemented as part of a text layout engine.

As illustrated in FIG. 10, the text layout system 1000 also includes rendering engine 1008. Rendering engine 1008 can use rendering tree 1022 to render the output text 1024 which has been modified to remove the overlaps. As discussed, unlike a typical rendering tree which includes nodes for each glyph, in some embodiments a node is created of each group of overlapping glyphs (e.g., two or more glyphs). When the rendering engine processes such a node, the geometry and other information about the glyphs associated with that node includes the modified geometry obtained from the glyph geometry manager. As a result, the modified geometry is rendered, automatically removing overlaps without manual intervention and without reducing the text to its outlines.

As illustrated in FIG. 10, the text layout system 1000 also includes the storage manager 1010. The storage manager 1010 maintains data for the text layout system 1000. The storage manager 1010 can maintain data of any type, size, or kind as necessary to perform the functions of the text layout system 1000. The storage manager 1010, as shown in FIG. 10, includes the input text 1018. The input text 1018 any text data received by the text layout system, as discussed in additional detail above. As further illustrated in FIG. 10, the storage manager 1010 also includes input modified geometry 1020. The modified geometry 1020 includes information defining the outlines of the glyph as modified by the glyph geometry manager 1006, as discussed above, and as used by the text layout system 1000 when rendering those glyphs. The storage manager 1010 may also include rendering tree 1022. The rendering tree 1022 may include glyph strike information, as discussed above. The rendering tree is created from a text layout tree that includes may include multiple levels corresponding to line strikes, segment strikes, and glyph strikes. The glyph nodes, which include outline and position information for the glyph, can include overlapping glyph nodes which include the outline and position information (e.g., modified geometry) for the group of overlapping glyphs. The rendering tree is used by the rendering engine to render the output text 1024. The output text 1024 includes the rendered input text that has been modified to remove overlaps, as discussed herein.

Each of the components 1002-1010 of the text layout system 1000 and their corresponding elements (as shown in FIG. 10) may be in communication with one another using any suitable communication technologies. It will be recognized that although components 1002-1010 and their corresponding elements are shown to be separate in FIG. 10, any of components 1002-1010 and their corresponding elements may be combined into fewer components, such as into a single facility or module, divided into more components, or configured into different components as may serve a particular embodiment.

The components 1002-1010 and their corresponding elements can comprise software, hardware, or both. For example, the components 1002-1010 and their corresponding elements can comprise one or more instructions stored on a computer-readable storage medium and executable by processors of one or more computing devices. When executed by the one or more processors, the computer-executable instructions of the text layout system 1000 can cause a client device and/or a server device to perform the methods described herein. Alternatively, the components 1002-1010 and their corresponding elements can comprise hardware, such as a special purpose processing device to perform a certain function or group of functions. Additionally, the components 1002-1010 and their corresponding elements can comprise a combination of computer-executable instructions and hardware.

Furthermore, the components 1002-1010 of the text layout system 1000 may, for example, be implemented as one or more stand-alone applications, as one or more modules of an application, as one or more plug-ins, as one or more library functions or functions that may be called by other applications, and/or as a cloud-computing model. Thus, the components 1002-1010 of the text layout system 1000 may be implemented as a stand-alone application, such as a desktop or mobile application. Furthermore, the components 1002-1010 of the text layout system 1000 may be implemented as one or more web-based applications hosted on a remote server. Alternatively, or additionally, the components of the text layout system 1000 may be implemented in a suit of mobile device applications or "apps."

Figure 11:
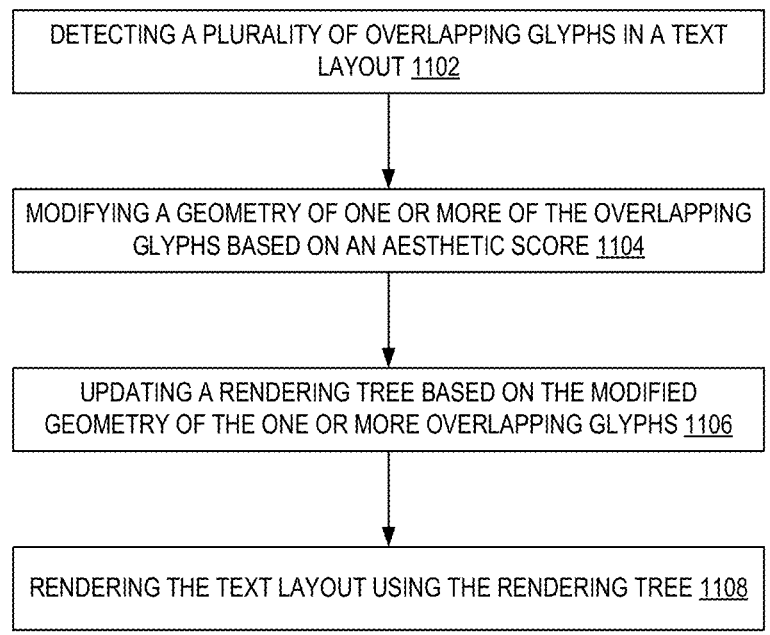
FIG. 11 illustrates a flowchart of a series of acts in a method of modifying overlapping glyphs in live text in accordance with one or more embodiments.
Figure 12:
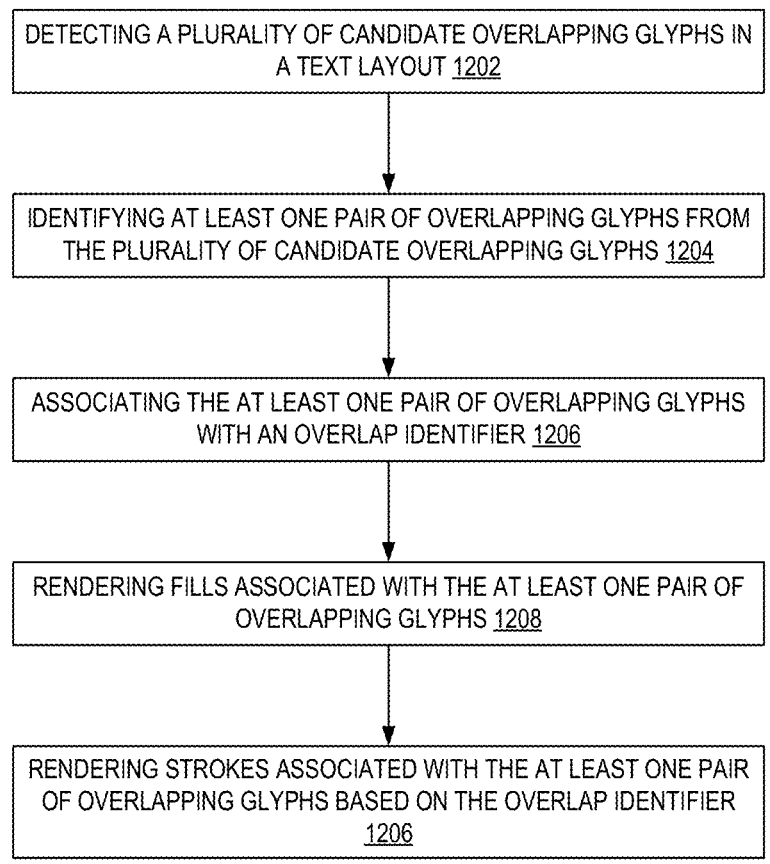
FIG. 12 illustrates a flowchart of a series of acts in a method of rendering modified overlapping glyphs in live text in accordance with one or more embodiments.

FIGS. 1-10, the corresponding text, and the examples, provide a number of different systems and devices that enable automatic identification and removal of overlaps from glyphs. In addition to the foregoing, embodiments can also be described in terms of flowcharts comprising acts and steps in a method for accomplishing a particular result. For example, FIGS. 11 and 12 illustrate flowcharts of exemplary methods in accordance with one or more embodiments. The methods described in relation to FIGS. 11 and 12 may be performed with fewer or more steps/acts or the steps/acts may be performed in differing orders. Additionally, the steps/acts described herein may be repeated or performed in parallel with one another or in parallel with different instances of the same or similar steps/acts.

FIG. 11 illustrates a flowchart of a series of acts in a method of modifying overlapping glyphs in live text in accordance with one or more embodiments.

As illustrated in FIG. 11, the method 1100 includes an act 1102 of detecting a plurality of overlapping glyphs in a text layout. As discussed, overlapping glyphs are detected by comparing position data and bounding boxes of adjacent glyphs in the text layout. In some embodiments, the adjacent glyphs include one or more glyphs on a same line as the glyph or one or more glyphs on a line above or below the glyph. If the position data of one glyph falls within the bounding box of another glyph, then these glyphs may be overlapping. Once the candidate overlapping glyphs have been identified, their outlines are compared to determine whether there are any intersections.

If the outlines intersect, then they are overlapping glyphs. For example, in some embodiments, adding the plurality of overlapping glyphs to an overlapping glyphs list. In some embodiments, detecting the plurality of overlapping glyphs includes determining a plurality of candidate overlapping glyphs by comparing a bounding box of a first glyph with positions of one or more adjacent glyphs and determining the plurality of overlapping glyphs from the plurality of candidate overlapping glyphs by identifying at least one outline intersection between the glyph and the one or more adjacent glyphs.

As illustrated in FIG. 11, the method 1100 includes an act 1104 of modifying a geometry of one or more of the overlapping glyphs based on an aesthetic score. As discussed, the overlapping glyphs may be merged, or one overlapping glyph may be modified based on the outline of the other overlapping glyph. In some embodiments, modifying the geometry of the one or more of the overlapping glyphs includes for each pair of overlapping glyphs from the overlapping glyphs list: identifying a first overlapped region, obtaining an outline of each of the overlapping glyphs from a font engine, and modifying the outline of a first overlapping glyph based on the outline of a second overlapping glyph and an offset value, wherein the first glyph has a lower aesthetic score than the second glyph. In some embodiments, the aesthetic score is calculated using Birkhoff's formula.

As illustrated in FIG. 11, the method 1100 includes an act 1106 of updating a rendering tree based on the modified geometry of the one or more overlapping glyphs. As discussed, the rendering tree may be a text DOM or other data structure which includes a plurality of nodes. The rendering tree may include multiple levels (e.g., line strikes, segment strikes, and glyph strikes, with nodes on the lowest level including glyph metadata used for rendering the glyphs. Instead of individual glyph nodes, in some embodiments a pair of overlapping glyphs is associated with one node which includes the modified geometry for the overlapping glyphs. In some embodiments, updating the rendering tree includes adding a node to the rendering tree for each pair of overlapping glyphs. A given node associated with a pair of overlapping glyphs includes at least the modified geometry associated with the pair of overlapping glyphs.

As illustrated in FIG. 11, the method 1100 includes an act 1108 of rendering the text layout using the rendering tree. For example, the glyph data and/or metadata associated with each node of the rendering tree is used by a rendering engine to render the glyphs in the text layout. As discussed, this allows for the elimination of overlaps in live text as it is entered into a text layout application. The user can edit the text by changing glyphs as they would in any other text layout application and the overlaps are automatically corrected as the text is rendered.

FIG. 12 illustrates a flowchart of a series of acts in a method of rendering modified overlapping glyphs in live text in accordance with one or more embodiments.

As illustrated in FIG. 12, the method 1200 includes an act 1202 of detecting a plurality of candidate overlapping glyphs in a text layout. As discussed, overlapping glyphs are detected by comparing position data and bounding boxes of adjacent glyphs in the text layout. In some embodiments, the adjacent glyphs include one or more glyphs on a same line as the glyph or one or more glyphs on a line above or below the glyph. If the position data of one glyph falls within the bounding box of another glyph, then these glyphs may be overlapping. For example, these glyphs can be added to the candidate overlapping glyphs list.

As illustrated in FIG. 12, the method 1200 includes an act 1204 of identifying at least one pair of overlapping glyphs from the plurality of candidate overlapping glyphs. For example, outline data associated with each pair (or other group) of the candidate overlapping glyphs can be retrieved (e.g., from a font engine, font dictionary, etc.) and the outlines can be compared to determine whether they intersect. If a given group of candidate overlapping glyphs do not intersect, then they can be ignored. If they do intersect, then they are added to an overlapping glyphs list. Alternatively, those candidate glyphs that do not intersect can be removed from the candidate overlapping glyphs list, resulting in an overlapping glyphs list once the non-intersecting glyphs have been removed.

As illustrated in FIG. 12, the method 1200 includes an act 1206 of associating the at least one pair of overlapping glyphs with an overlap identifier. In some embodiments, a unique identifier is assigned to each grouping of overlapping glyphs. As discussed, the unique identifier can be used during rendering to ensure the overlapping glyphs are rendered correctly to remove the overlaps.

As illustrated in FIG. 12, the method 1200 includes an act 1208 of rendering fills associated with the at least one pair of overlapping glyphs. As discussed, in some embodiments, fill pixels are written (e.g., to a frame buffer) and associated with the unique identifier and a sentinel value indicating they are fill pixels. In some embodiments, rendering fills includes setting a sentinel value for each pixel associated with the overlap identifier.

As illustrated in FIG. 12, the method 1200 includes an act 1210 of rendering strokes associated with the at least one pair of overlapping glyphs based on the overlap identifier. As discussed, fill pixels take precedence over stroke pixels, this ensures that stroke pixels do not overwrite fill pixels in overlapping glyphs, effectively merging the overlapping glyphs to remove the overlaps. In some embodiments, rendering strokes associated with the at least one pair of overlapping glyphs includes checking the sentinel value for a pixel being rendered and if the sentinel value is set, ignoring a stroke value associated with that pixel, or if the sentinel value is not set, overwriting a fill value with the stroke value associated with that pixel.

In some embodiments, text effects are applied either before or after the glyph geometry is modified. This pre- or post-processing is user-selectable and/or may default to a particular behavior. In some embodiments, applying text effects includes determining a merged outline of the at least one pair of overlapping glyphs and applying an effect to the text layout using the merged outline.

Figure 13:
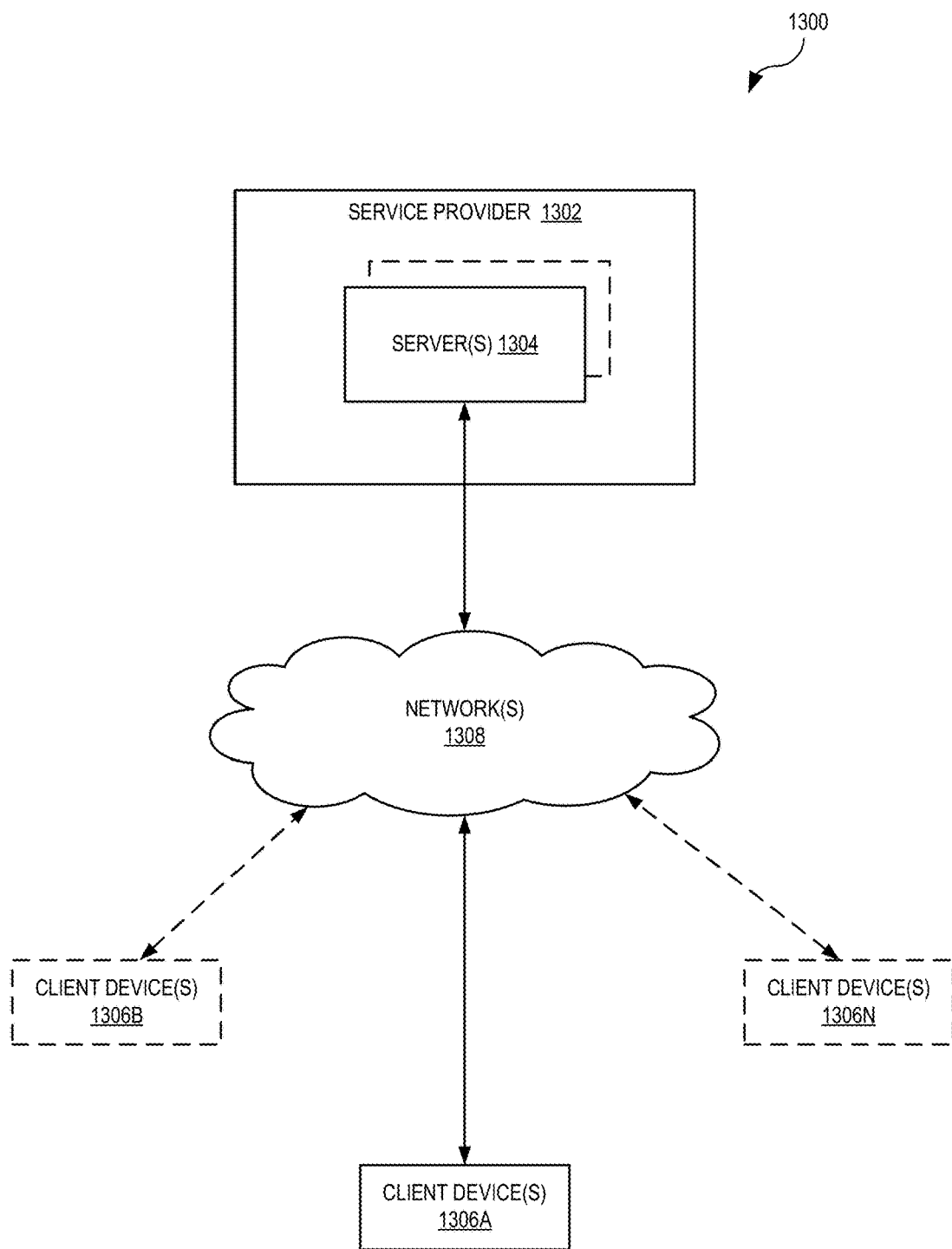
FIG. 13 illustrates a schematic diagram of an exemplary environment in which the image processing system can operate in accordance with one or more embodiments.

FIG. 13 illustrates a schematic diagram of an exemplary environment 1300 in which the text layout system 1000 can operate in accordance with one or more embodiments. In one or more embodiments, the environment 1300 includes a service provider 1302 which may include one or more servers 1304 connected to a plurality of client devices 1306A-1306N via one or more networks 1308. The client devices 1306A-1306N, the one or more networks 1308, the service provider 1302, and the one or more servers 1304 may communicate with each other or other components using any communication platforms and technologies suitable for transporting data and/or communication signals, including any known communication technologies, devices, media, and protocols supportive of remote data communications, examples of which will be described in more detail below with respect to FIG. 14.

Although FIG. 13 illustrates a particular arrangement of the client devices 1306A-1306N, the one or more networks 1308, the service provider 1302, and the one or more servers 1304, various additional arrangements are possible. For example, the client devices 1306A-1306N may directly communicate with the one or more servers 1304, bypassing the network 1308. Or alternatively, the client devices 1306A-1306N may directly communicate with each other. The service provider 1302 may be a public cloud service provider which owns and operates their own infrastructure in one or more data centers and provides this infrastructure to customers and end users on demand to host applications on the one or more servers 1304. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1304. In some embodiments, the service provider may be a private cloud provider which maintains cloud infrastructure for a single organization. The one or more servers 1304 may similarly include one or more hardware servers, each with its own computing resources, which are divided among applications hosted by the one or more servers for use by members of the organization or their customers.

Similarly, although the environment 1300 of FIG. 13 is depicted as having various components, the environment 1300 may have additional or alternative components. For example, the environment 1300 can be implemented on a single computing device with the text layout system 1000. In particular, the text layout system 1000 may be implemented in whole or in part on the client device 1302A.

As illustrated in FIG. 13, the environment 1300 may include client devices 1306A-1306N. The client devices 1306A-1306N may comprise any computing device. For example, client devices 1306A-1306N may comprise one or more personal computers, laptop computers, mobile devices, mobile phones, tablets, special purpose computers, TVs, or other computing devices, including computing devices described below with regard to FIG. 14. Although three client devices are shown in FIG. 13, it will be appreciated that client devices 1306A-1306N may comprise any number of client devices (greater or smaller than shown).

Moreover, as illustrated in FIG. 13, the client devices 1306A-1306N and the one or more servers 1304 may communicate via one or more networks 1308. The one or more networks 1308 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1308 may be any suitable network over which the client devices 1306A-1306N may access service provider 1302 and server 1304, or vice versa. The one or more networks 1308 will be discussed in more detail below with regard to FIG. 14.

In addition, the environment 1300 may also include one or more servers 1304. The one or more servers 1304 may generate, store, receive, and transmit any type of data, including input text 1018, modified geometry 1020, rendering tree 1022, output text 1024, or other information. For example, a server 1304 may receive data from a client device, such as the client device 1306A, and send the data to another client device, such as the client device 1302B and/or 1302N. The server 1304 can also transmit electronic messages between one or more users of the environment 1300. In one example embodiment, the server 1304 is a data server. The server 1304 can also comprise a communication server or a web-hosting server. Additional details regarding the server 1304 will be discussed below with respect to FIG. 14.

As mentioned, in one or more embodiments, the one or more servers 1304 can include or implement at least a portion of the text layout system 1000. In particular, the text layout system 1000 can comprise an application running on the one or more servers 1304 or a portion of the text layout system 1000 can be downloaded from the one or more servers 1304. For example, the text layout system 1000 can include a web hosting application that allows the client devices 1306A-1306N to interact with content hosted at the one or more servers 1304. To illustrate, in one or more embodiments of the environment 1300, one or more client devices 1306A-1306N can access a webpage supported by the one or more servers 1304. In particular, the client device 1306A can run a web application (e.g., a web browser) to allow a user to access, view, and/or interact with a webpage or website hosted at the one or more servers 1304.

Upon the client device 1306A accessing a webpage or other web application hosted at the one or more servers 1304, in one or more embodiments, the one or more servers 1304 can provide access to a text layout application executing on the one or more servers 1304. Moreover, the client device 1306A can receive text input via a client application, such as a web application, associated with the text layout application, and provide the text input to the one or more servers 1304. Upon receiving the input, the one or more servers 1304 can automatically perform the methods and processes described above to identify and modify overlapping glyphs. The one or more servers 1304 can provide the data needed to accurately render the modified glyphs, to the client device 1306A for display to the user.

As just described, the text layout system 1000 may be implemented in whole, or in part, by the individual elements 1302-1308 of the environment 1300. It will be appreciated that although certain components of the text layout system 1000 are described in the previous examples with regard to particular elements of the environment 1300, various alternative implementations are possible. For instance, in one or more embodiments, the text layout system 1000 is implemented on any of the client devices 1306A-N. Similarly, in one or more embodiments, the text layout system 1000 may be implemented on the one or more servers 1304. Moreover, different components and functions of the text layout system 1000 may be implemented separately among client devices 1306A-1306N, the one or more servers 1304, and the network 1308.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
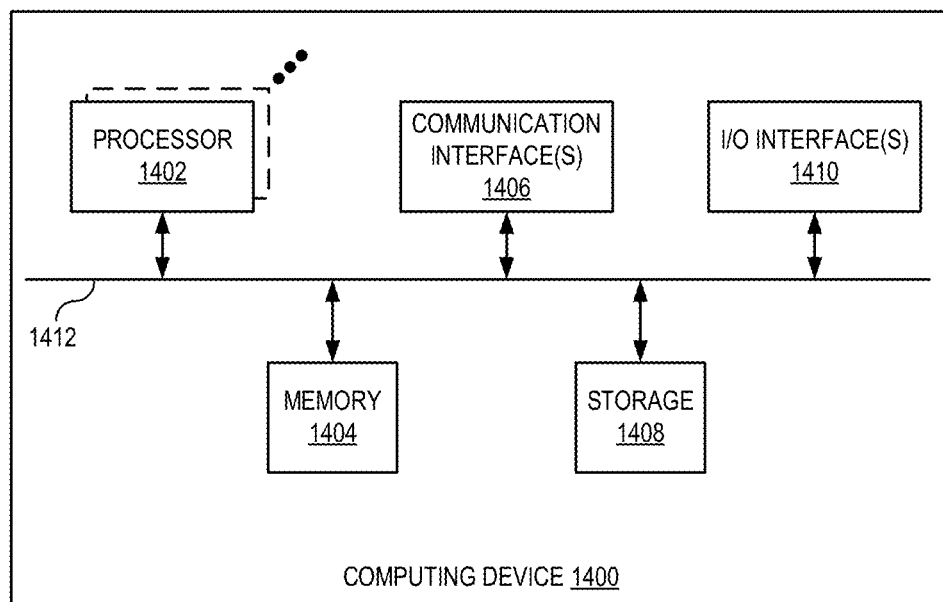
FIG. 14 illustrates a block diagram of an exemplary computing device in accordance with one or more embodiments.

FIG. 14 illustrates, in block diagram form, an exemplary computing device 1400 that may be configured to perform one or more of the processes described above. One will appreciate that one or more computing devices such as the computing device 1400 may implement the image processing system. As shown by FIG. 14, the computing device can comprise a processor 1402, memory 1404, one or more communication interfaces 1406, a storage device 1408, and one or more I/O devices/interfaces 1410. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1408 and decode and execute them. In various embodiments, the processor(s) 1402 may include one or more central processing units (CPUs), graphics processing units (GPUs), field programmable gate arrays (FPGAs), systems on chip (SoC), or other processor(s) or combinations of processors.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 may be internal or distributed memory.

The computing device 1400 can further include one or more communication interfaces 1406. A communication interface 1406 can include hardware, software, or both. The communication interface 1406 can provide one or more interfaces for communication (such as, for example, packet-based communication) between the computing device and one or more other computing devices 1400 or one or more networks. As an example and not by way of limitation, communication interface 1406 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

The computing device 1400 includes a storage device 1408 includes storage for storing data or instructions. As an example, and not by way of limitation, storage device 1408 can comprise a non-transitory storage medium described above. The storage device 1408 may include a hard disk drive (HDD), flash memory, a Universal Serial Bus (USB) drive or a combination these or other storage devices. The computing device 1400 also includes one or more input or output ("I/O") devices/interfaces 1410, which are provided to allow a user to provide input to (such as user strokes), receive output from, and otherwise transfer data to and from the computing device 1400. These I/O devices/interfaces 1410 may include a mouse, keypad or a keyboard, a touch screen, camera, optical scanner, network interface, modem, other known I/O devices or a combination of such I/O devices/interfaces 1410. The touch screen may be activated with a stylus or a finger.

The I/O devices/interfaces 1410 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1410 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   detecting a plurality of overlapping glyphs in a text layout;
   identifying an overlapping region, wherein the overlapping region includes a first overlapping glyph of the plurality of overlapping glyphs and a second overlapping glyph of the plurality of overlapping glyphs;
   selecting a glyph of the first overlapping glyph or the second overlapping glyph to be modified based on a comparison of an aesthetic score of a portion of the first overlapping glyph in the overlapping region and an aesthetic score of a portion of the second overlapping glyph in the overlapping region, wherein the aesthetic score is calculated by applying Birkhoff s formula to one or more Bezier segments of the overlapping region;
   expanding an outline of the selected glyph to modify a geometry of one or more overlapping glyphs of the plurality of overlapping glyphs;
   updating a rendering tree including one or more nodes associated with one or more glyphs, wherein the rendering tree is updated by updating a node of the one or more nodes based on the modified geometry of the one or more overlapping glyphs; and
   rendering the text layout using the rendering tree.

2. The method of claim 1, wherein detecting a plurality of overlapping glyphs in a text layout, further comprises:
   determining a plurality of candidate overlapping glyphs by comparing a bounding box of a first glyph with positions of one or more adjacent glyphs; and
   determining the plurality of overlapping glyphs from the plurality of candidate overlapping glyphs by identifying at least one outline intersection between the first glyph and the one or more adjacent glyphs.

3. The method of claim 2, wherein the one or more adjacent glyphs include one or more glyphs on a same line as the first glyph or one or more glyphs on a line above or below the first glyph.

4. The method of claim 1, further comprising:
   adding the plurality of overlapping glyphs to an overlapping glyphs list.

5. The method of claim 4, expanding the outline of the selected glyph to modify a geometry of the one or more overlapping glyphs, further comprises:
   for each pair of overlapping glyphs from the overlapping glyphs list:
   identifying a first overlapped region;
   obtaining an outline of each of the overlapping glyphs from a font engine; and
   modifying the outline of a first overlapping glyph based on the outline of a second overlapping glyph and an offset value, wherein the first overlapping glyph has a lower aesthetic score than the second overlapping glyph.

6. The method of claim 4, wherein updating a rendering tree based on the modified geometry of the one or more overlapping glyphs, further comprises:
   adding a node to the rendering tree for each pair of overlapping glyphs.

7. The method of claim 6, wherein a node associated with a pair of overlapping glyphs includes at least the modified geometry associated with the pair of overlapping glyphs.

8. The method of claim 1, wherein the updated node is associated with at least two glyphs of the plurality of overlapping glyphs.

9. A non-transitory computer-readable medium storing executable instructions, which when executed by a processing device, cause the processing device to perform operations comprising:
   detecting a plurality of overlapping glyphs in a text layout;
   identifying an overlapping region, wherein the overlapping region includes a first overlapping glyph of the plurality of overlapping glyphs and a second overlapping glyph of the plurality of overlapping glyphs:
   selecting a glyph of the first overlapping glyph or the second overlapping glyph to be modified based on a comparison of an aesthetic score of a portion of the first overlapping glyph in the overlapping region and an aesthetic score of a portion of the second overlapping glyph in the overlapping region, wherein the aesthetic score is calculated by applying Birkhoff s formula to one or more Bezier segments of the overlapping region;
   expanding an outline of the selected glyph to modify a geometry of one or more overlapping glyphs of the plurality of overlapping glyphs;
   updating a rendering tree including one or more nodes associated with one or more glyphs, wherein the rendering tree is updated by updating a node of the one or more nodes based on the modified geometry of the one or more overlapping glyphs; and
   rendering the text layout using the rendering tree.

10. The non-transitory computer-readable medium of claim 9, wherein the operation of detecting a plurality of overlapping glyphs in a text layout, further comprises:
    determining a plurality of candidate overlapping glyphs by comparing a bounding box of a first glyph with positions of one or more adjacent glyphs; and
    determining the plurality of overlapping glyphs from the plurality of candidate overlapping glyphs by identifying at least one outline intersection between the first glyph and the one or more adjacent glyphs.

11. The non-transitory computer-readable medium of claim 10, wherein the one or more adjacent glyphs include one or more glyphs on a same line as the first glyph or one or more glyphs on a line above or below the first glyph.

12. The non-transitory computer-readable medium of claim 9, wherein the executable instructions, when executed, further cause the processing device to perform operations comprising:
   adding the plurality of overlapping glyphs to an overlapping glyphs list.

13. The non-transitory computer-readable medium of claim 12, wherein the operation of expanding the outline of the selected glyph to modify a geometry of the one or more overlapping glyphs, further comprises:
   for each pair of overlapping glyphs from the overlapping glyphs list:
      identifying a first overlapped region;
      obtaining an outline of each of the overlapping glyphs from a font engine; and
      modifying the outline of a first overlapping glyph based on the outline of a second overlapping glyph and an offset value, wherein the first overlapping glyph has a lower aesthetic score than the second overlapping glyph.

14. The non-transitory computer-readable medium of claim 12, wherein the operation of updating a rendering tree based on the modified geometry of the one or more overlapping glyphs, further comprises:
   adding a node to the rendering tree for each pair of overlapping glyphs.

15. The non-transitory computer-readable medium of claim 14, wherein a node associated with a pair of overlapping glyphs includes at least the modified geometry associated with the pair of overlapping glyphs.

16. The non-transitory computer-readable medium of claim 9, wherein the updated node is associated with at least two glyphs of the plurality of overlapping glyphs.

17. A system comprising:
   a memory component; and
   a processing device coupled to the memory component, the processing device to perform operations comprising:
      detecting a plurality of candidate overlapping glyphs in a text layout;
      identifying at least one pair of overlapping glyphs from the plurality of candidate overlapping glyphs;
      identifying an overlapping region, wherein the overlapping region includes a first overlapping glyph of the pair of overlapping glyphs and a second overlapping glyph of the pair of overlapping glyphs;
      selecting a glyph from the first overlapping glyph or the second overlapping glyph to be modified based on a comparison of an aesthetic score of a portion of the first overlapping glyph in the overlapping region and an aesthetic score of a portion of the second overlapping glyph in the overlapping region, wherein the aesthetic score is calculated by applying Birkhoff's formula to one or more Bezier segments of the overlapping region;
      expanding an outline of the selected glyph;
      associating the at least one pair of overlapping glyphs with an overlap identifier;
      rendering one or more fill pixels associated with the at least one pair of overlapping glyphs; and
      responsive to determining that a stroke pixel is not a fill pixel, rendering one or more stroke pixels associated with the at least one pair of overlapping glyphs based on the overlap identifier.

18. The system of claim 17, wherein the operation of rendering fills associated with the at least one pair of overlapping glyphs further comprises:
   setting a sentinel value for each pixel associated with the overlap identifier.

19. The system of claim 18, wherein the operation of rendering strokes associated with the at least one pair of overlapping glyphs based on the overlap identifier further comprises:
   checking the sentinel value for a pixel being rendered; and
   if the sentinel value is set, ignoring a stroke value associated with that pixel; or
   if the sentinel value is not set, overwriting a fill value with the stroke value associated with that pixel.

20. The system of claim 17, wherein the operations further comprise:
   determining a merged outline of the at least one pair of overlapping glyphs; and
   applying an effect to the text layout using the merged outline.

* * * * *